(12) United States Patent
Dukart

(10) Patent No.: US 7,073,391 B2
(45) Date of Patent: Jul. 11, 2006

(54) FORCE SENSOR

(75) Inventor: Anton Dukart, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/493,975

(22) PCT Filed: Mar. 27, 2003

(86) PCT No.: PCT/DE03/01013

§ 371 (c)(1),
(2), (4) Date: Apr. 26, 2004

(87) PCT Pub. No.: WO2004/003501

PCT Pub. Date: Jan. 8, 2004

(65) Prior Publication Data

US 2004/0255687 A1  Dec. 23, 2004

(30) Foreign Application Priority Data

Jun. 28, 2002  (DE) ............................... 102 29 020

(51) Int. Cl.
*G01B 7/16* (2006.01)
*G01L 1/00* (2006.01)

(52) U.S. Cl. ...................................................... 73/779

(58) Field of Classification Search .................. 73/779, 73/862.69, 862.625, 862.333, 862.36; 307/10.1
See application file for complete search history.

(56) References Cited

U.S. PATENT DOCUMENTS 4,497,375 A * 2/1985 Mucheyer et al. ............ 172/10
4,572,005 A * 2/1986 Kita ....................... 73/862.333
4,827,240 A * 5/1989 Hafner ............................ 338/2
4,982,613 A * 1/1991 Becker ................... 73/862.625
5,027,657 A * 7/1991 Juckenack et al. ........ 73/514.13
5,195,377 A * 3/1993 Garshelis ...................... 73/779
5,339,699 A   8/1994 Carignan
5,608,270 A   3/1997 Meister
6,813,966 B1 * 11/2004 Dukart ..................... 73/862.69
6,865,961 B1 * 3/2005 Wolf et al. ............... 73/862.69

FOREIGN PATENT DOCUMENTS

EP  0 713 637 A   5/1996
WO  00/16054   3/2003

* cited by examiner

*Primary Examiner*—Max Noori
*Assistant Examiner*—Octavia Davis
(74) *Attorney, Agent, or Firm*—Michael J. Striker

(57) ABSTRACT

A force sensor, in particular for detecting the forces on a vehicle seat, includes a force measurement cell (1) that has a Hall element. The force measurement cell (1) includes at least one bending bar (2, 3), which from the exertion of force to be detected exeris an influence on the magnetic field in the region of a magnetic-field-sensitive sensor element (6) of the measurement cell (1). The sensing is done with a Hall element (6), held on the at least one bending bar (2, 3), which element, under the force exerted on the bending bar (2, 3), can be deflected in the field of a relatively stationary permanent magnet (4), and a magnetic diagnosis field in the region of the Hall element (6) can be generated whose field lines are located in the plane of the sensor element without influencing the measurement field.

8 Claims, 1 Drawing Sheet

FORCE SENSOR

Figure 1:
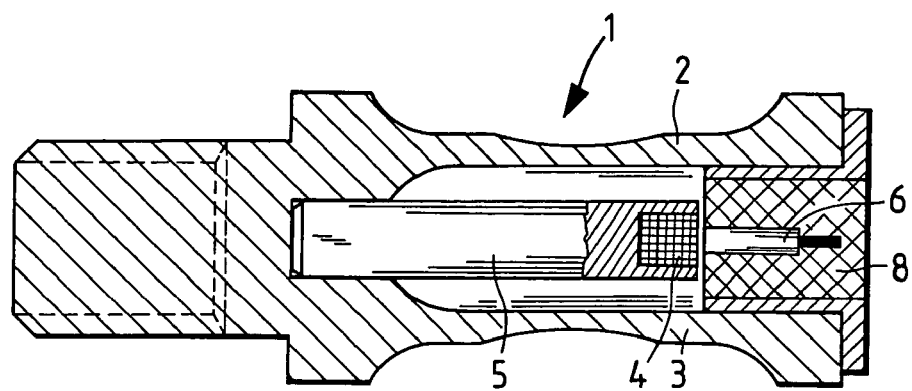

This application is a 371 of PCT/DE03/01013.

BACKGROUND OF THE INVENTION

The invention relates to a force sensor, in particular for detecting forces on a vehicle seat, which by utilizing electrical or electromagnetic effects outputs an electrical signal which corresponds to a compressive force, tensile force or bending force acting on the force sensor.

In many fields in mechanics, force sensors are needed which even at relatively inaccessible places in equipment or assemblies are meant to enable precise determination of the tensile and/or compressive forces. An electrical signal corresponding to the force measurement is intended to be available for further processes of evaluation or regulation. In the field of automotive electronics, for instance, such force sensors can often be used, but the force sensors used until now are mostly relatively large, and the production process is relatively expensive.

For some important electronic systems in the motor vehicle, such as for belt restraint systems, a small, compact force sensor is needed. Precisely at the connecting points between components, at which points the force is concentrated, force measuring bolts as a component of the force sensor are of particular importance. For instance, for measuring the force of the weight on a seat and its distribution, which is measured at the connection to the seat, a force sensor is needed which can be mass produced economically in large numbers. But in the fields of production and quality measurement as well, precise force sensors that measure statically are increasingly needed.

From International Patent Disclosure WO 00/16054 A1, a measurement pickup for detecting motion in a vehicle seat is known, in which an elastic deformation of a supporting element is detected by the measurement cell between an upper frame, including the seating shell, and a lower frame, secured to the floor of the vehicle, optionally also via a mechanism for longitudinal and vertical adjustment.

It is also known per se for such a measurement cell to have a Hall element with an integrated circuit connected to it, with which element a magnetic field that is altered because of a mechanical deformation can be evaluated. Until now, in the known embodiment, the self-diagnosis that is important for reliable function, such as the diagnosis pertaining to security against mispolarization and the diagnosis of the sensor connection, the bond pins, and other IC-specific details, has been limited to the integrated sensor circuit (sensor IC).

SUMMARY OF THE INVENTION

A force sensor of the type described at the outset, particularly for detecting the forces on a vehicle seat, with a force measurement cell that has a Hall element is advantageously refined in such a way that the measurement cell includes at least one bending bar, which from the force exertion to be detected exerts influence on the magnetic field in the region of a magnetic-field-sensitive sensor element. The sensor element comprises a Hall element, retained on the at least one bending bar, which under the force exerted on the bending bar can be deflected in the field of a relatively stationary permanent magnet. According to the invention, a magnetic diagnosis field in the region of the Hall element can advantageously be generated, whose field lines are located in the plane of the sensor element without influencing the measurement field.

The diagnosis that is advantageously possible here goes beyond self-diagnosis of the integrated circuit in the Hall element with respect to short-circuit capabilities of the pins to prevent mispolarization and other short circuits. Since the entire force sensor also comprises mechanical components, such as the bending bar and a permanent magnet, its functional monitoring during operation can advantageously be improved with the invention.

To that end, only one additional coil is needed in the force sensor, for generating a diagnosis field. The excitation of the coil can be done in a simple way via an alternating voltage signal, which is modulated up to the supply voltage. A diode in the control unit prevents the current through the coil, and a capacitor can also be connected in series with the coil in order to form a series resonant circuit. In this way, the sensor can be operated with a requisite voltage supply, and the coil can simultaneously be operated with an alternating voltage without any direct component.

The permanent magnet is repelled or attracted by the magnetic field of the coil depending on the instantaneous sign of the alternating voltage and thus on the induced field. The field direction is located in the plane of the Hall element and thus does not alter the magnetic flux in the sensitive direction of the Hall element.

The total force sensor has two pronounced mechanical resonant frequencies. The first results from only the mechanical dimension of the holder of the permanent magnet; the second resonant frequency is determined by the bending bar and is higher, but both resonant frequencies are located outside the measurement frequency of the Hall element.

If the coil is excited at the resonant frequency of the magnet holder, then its periodic deflection is obtained, which in turn can be measured as an output signal of the integrated circuit of the Hall element (Hall IC). In this way, according to the invention, information is obtained about the functioning of the entire system, without requiring an additional connection. For instance, if the entire suspension of the measurement cell is broken, then the stop-limit gap closes, and the bending bar can no longer oscillate. If the permanent magnet loses its properties or comes loose in some way, oscillatory excitation is again no longer possible.

The alternating voltage for exciting the coil can be derived in a simple way directly from the clock signal of a microprocessor, in this case the CPU of the integrated circuit. The excitation of the coil can either be done continuously or in only chronologically limited pulses, in which case the decay is utilized for diagnosis. For monitoring the resonant frequencies of the structure, because of the very strong permanent magnet, only little energy is needed for the coil triggering events; that is, accordingly only low voltages and currents are necessary.

In summary, it can be stated that by means of the detection of the resonant frequencies and/or the resonant amplitudes according to the invention, additional diagnostic redundance for complete sensor monitoring is created at little expense and without additional connections.

BRIEF DESCRPTION OF THE DRAWINGS

Figure 2:
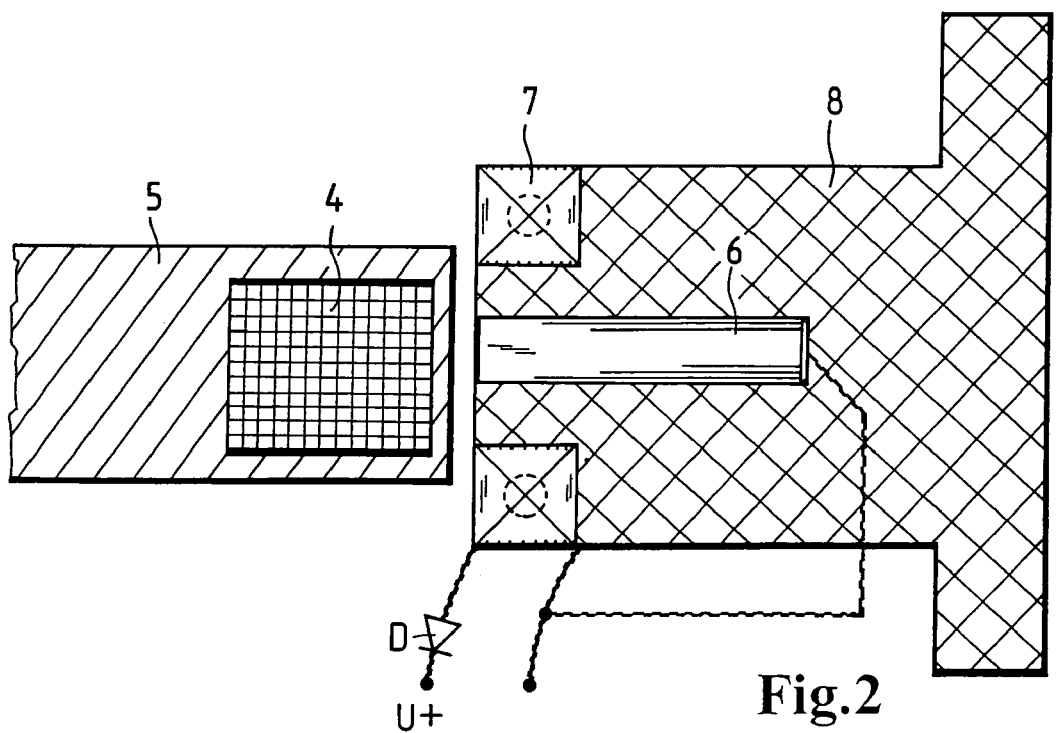

One exemplary embodiment of a force sensor of the invention for detecting the forces on a vehicle seat will be explained in conjunction with the drawing. Shown are:

FIG. 1, a section through a force measurement cell for a vehicle seat in a motor vehicle, having a Hall element as its sensor element; and FIG. 2, a detail of a section through a Hall force sensor with a coil for generating a diagnosis field.

DETAILED DESCRIPTION OF THE PREFERRED EMBODIMENTS

In FIG. 1, a force measurement cell or force measuring bolt 1 for a force sensor is shown, for instance for detecting the weight on a vehicle seat, not explained in detail here, of a motor vehicle. The force measurement cell 1 has two bending bars 2 and 3. On a fixed end, a permanent magnet 4 is also held by means of a nonmagnetic pin 5 press-fitted into a bore, while on the other end, which is moved by the bending bar, there is a Hall element 6 with a connected integrated circuit (Hall IC); this circuit furnishes an electrical output signal dependent on the deflection of the bending bars 2 and 3.

From a detail view in FIG. 2 showing the permanent magnet 4 and the Hall element or Hall IC 6, an additional coil 7 for generating a diagnosis field can be seen. The excitation of the coil 7 is done with an alternating voltage signal, which is modulated up to the supply voltage U+; a diode D in the control unit prevents a direct current from flowing through the coil 7. The field direction of the magnetic field generated by the coil 7 is located in the plane of the Hall element 6 and thus does not alter the magnetic flow in the sensitive direction of the Hall element 6.

For self-diagnosis of the arrangement, the coil 7 is for instance either excited at the resonant frequency of the magnet holder 4, 5 or of the bending bars 2 and 3, resulting in their periodic deflection, which in turn can be measured as an output signal of the integrated circuit of the Hall element (Hall IC) 6, so that thus the complete mode of operation of the arrangement can be monitored.

The invention claimed is:

1. A force sensor, comprising,
   a force measurement cell (1) that has a Hall element, wherein the force measurement cell (1) includes at least one bending bar (2, 3), which on the basis of the exertion of force to be detected exerts an influence on the magnetic field In the region of a magnetic-field-Sensitive sensor element (6) of the farce measurement cell (1);
   wherein the sensor element comprises a Hall element (8), retained on the at least one bending bar (2, 3), which element can be deflected by the force exerted on the bending bar (2, 3) within the field of a permanent magnet (4) disposed in relatively stationary fashion;
   wherein a magnetic diagnosis field in the region of the Hall element (6) can be generated, the field lines of which are located in the plane of the Hall element (6) without influencing the measurementent; wherein the force measurement cell (1) is employed for detecting the forces on a vehicle seat of a motor vehicle; and
   wherein the voltage supply of a coil (7) for generating the diagnosis field in the plane of the Hall element (6) is effected by means of an alternating voltage, modulated up to the supply voltage of the Hall element (6), a diode (D) or a capacitor is connected in series in a supply line for the coil (7).

2. The force sensor of claim 1, wherein the diagnosis field is an alternating field, whose frequency is outside the measurement frequency of the sensor element (6) and includes at least one resonant frequency of the mechanical makeup of the measurement cell (1).

3. The force sensor of claim 2, wherein a first resonant frequency is predetermined by the mechanical dimensioning of a holder of the permanent magnet (4).

4. The force sensor of claim 2, wherein a second resonant frequency is predetermined by the mechanical dimensioning of the bending bar (2, 3) of the measurement cell (1).

5. The force sensor of claim 1, wherein the coil (7) is wrapped around the Hall element (6).

6. The force sensor of claim 1, wherein the upward-module alternating voltage is derived from the clock signal of a microprocessor of the integrated circuit of the Hall element (6).

7. The force sensor of claim 6, wherein the alternating voltage is continuously present.

8. The force sensor of claim 6, wherein the alternating voltage is present in chronologically limited pulses, and the decay of the alternating voltage can be used for diagnosis.

* * * * *